United States Patent [19]
Audenard et al.

[11] 3,895,290
[45] July 15, 1975

[54] DEFECT DETECTION SYSTEM USING AN AND GATE TO DISTINGUISH SPECIFIC FLAW PARAMETERS

[75] Inventors: Bernard Audenard, Seclin; Michel Pigeon, Bures-sur-Yvette; Claude Stach, Faches-Thomesnil, all of France

[73] Assignee: Commissariat a l'Energie Atomique, Paris, France

[22] Filed: July 23, 1973

[21] Appl. No.: 382,052

[30] Foreign Application Priority Data
Aug. 3, 1972  France .................. 72.28119

[52] U.S. Cl. ................................. 324/37
[51] Int. Cl. .............................. G01r 33/12
[58] Field of Search ....................... 324/37, 40

[56]  References Cited
UNITED STATES PATENTS

| | | | |
|---|---|---|---|
| 3,278,839 | 10/1966 | Wells et al. | 324/40 |
| 3,405,354 | 10/1968 | Callan et al. | 324/40 |
| 3,475,681 | 10/1969 | Nerwin, Jr. et al. | 324/40 |

FOREIGN PATENTS OR APPLICATIONS

| | | | |
|---|---|---|---|
| 184,503 | 9/1966 | U.S.S.R. | 324/37 |

*Primary Examiner*—Robert J. Corcoran
*Attorney, Agent, or Firm*—Cameron, Kerkam, Sutton, Stowell & Stowell

[57]  ABSTRACT

The device has a high-speed phase meter which responds in one period of the defect signal to generate an analog signal which is proportional to the phase of the defect signal. A high-speed phase comparator delivers a phase logic signal when the phase analog signal is in a range between first and second threshold levels, a circuit for detecting the direction of the first phase unbalance delivers a direction logic signal when the first variation in the phase analog signal is in the direction of the range between the first and second threshold levels. A circuit generates a peak to peak amplitude analog signal whose amplitude is proportional to the defect signal. A high-speed peak amplitude comparator delivers a peak amplitude signal when the amplitude of the input analog signal is higher than a third threshold, at least one positioning cell is used which supplies positioning logic information and an AND-gate delivers a logical signal alarm signal when the aforementioned logical items are present.

5 Claims, 7 Drawing Figures

DEFECT DETECTION SYSTEM USING AN AND GATE TO DISTINGUISH SPECIFIC FLAW PARAMETERS

This invention relates to a device for controlling alarm systems as a function of the peak amplitude and the phase of a pulse as applicable in particular to instruments for nondestructive testing of materials, especially instruments based on the principle of eddy-current testing which make it possible to identify flaws of ever-decreasing size in materials and particularly in tubes.

It is possible to detect any type of defect in a tube, for example, provided that a suitable inspection frequency is selected. The method consists in studying the variations in eddy currents produced by the alternating field of a coil which is placed in the proximity of the part to be tested (probe). To this end, a sinusoidal current delivered by an oscillator having a continuously variable frequency such as 300 c/s to 300 kc/s is passed through the coil of the detector so as to produce a field which induces eddy currents within the part, thus producing a return field which acts in opposition to the initial field and consequently modifies the impedance of the coil.

The currents which are induced within the part have the same frequency as the excitation current but have different phases. Any flaw within the part modifies the intensity or the path of the eddy currents and consequently the impedance of the coil. A nondestructive test involves a study of the variations in said impedance.

It is necessary to identify the different types of defects both from the point of view of their position, their nature and their size or extent in order to permit selection of parts as a function of their qualities since different types of flaw can have different consequential effects on these qualities.

This identification can be carried out by studying the distribution of eddy currents in phase and in amplitude along the part to be tested. A large number of eddy-current testing instruments are at present in existence and a typical instrument generally comprises:

an oscillator which controls all the circuits and the sinusoidal voltage delivered by the oscillator is taken as a phase reference.

a measuring system which usually comprises two coils placed in two adjacent arms of a bridge. A variation in impedance of one of said coils produces an unbalance voltage which constitutes the measurement signal. Two adjacent sections of the sample are thus compared.

a device for scanning the signal which is usually preceded by a high-gain selective amplifier.

Phase analysis is based on the study of the difference in phase between the current which passes through the detector and the variation in terminal voltage which results from the variation in impedance.

A display of the different discontinuities can be made on a cathode-ray tube in accordance with the known method of the complex impedance plane, for example. It is in fact a known practice to make use of a nondestructive eddy-current testing device for extracting the components in phase and in quadrature of the signal being studied from the reference signal constituted by the signal which is delivered to the coils. The signals obtained are supplied to the horizontal and vertical deflection channels of an oscilloscope on which is displayed an oscillogram which characterizes the signal supplied by the bridge when a defective condition is detected in the object under test. Instruments for carrying out these tests within the frequency range of 300 c/s to 300 kc/s have been disclosed in French Pat. Nos. 1.585.061 of June 21st, 1968 and 1.588.827 of June 21st, 1968 in the name of Commissariat a l'Energie Atomique.

One object of the present invention consists in making use of a defect signal supplied by an eddy-current testing instrument and of the reference signal supplied by the oscillator of said instrument in order to generate a signal for controlling alarm systems as a function of the characteristics of the defects.

The invention accordingly proposes a device for controlling alarm systems which is characterized in that it comprises:

a high-speed phase meter which responds in one period of the defect signal in order to generate an analog signal which is proportional to the phase of the defect signal, a high-speed phase comparator, the analog signal which is proportional to the phase being applied to one input and two threshold phase signals being applied to the two other inputs of said comparator which delivers phase logic signals when the phase analog signal is in the range between said two thresholds, a circuit for detecting the direction of the first phase unbalance which delivers a direction logic signal when the first variation in the phase analog signal is in the direction of the range between the two thresholds, a circuit for generating the peak amplitude of the defect signal which delivers an analog signal of the peak amplitude signal whose amplitude is proportional to the defect signal, a high-speed peak amplitude comparator to which the peak amplitude analog signal is applied and which delivers a modulus peak logic signal when the amplitude of the input analog signal is higher than a third threshold applied to the second input thereof, at least one positioning cell which supplies a positioning logic signal of the measuring detector, an AND-gate which delivers a logical alarm signal when said logical signal items are present.

The device in accordance with the invention may comprise a number of control or analyses channels for determining whether the phase of the defect signal falls within one of a plurality of phase ranges, the amplitude threshold being either identical or different in the case of each peak amplitude in respect of the selected phase ranges. In this case, provision is made for a number of high-speed comparators for receiving the analog signal which is proportional to the phase and to the peak amplitude, said comparators being also associated with a circuit for detecting the direction of the first phase unbalance and also with a plurality of positioning cells.

In order to permit a comparison of the logical signals obtained, the respective inputs of a number of AND-gates are connected to the phase and peak amplitude comparators, to the circuit for detecting the direction of the first phase unbalance and to the positioning cells. The outputs of said AND-gates deliver corresponding alarm signals.

The alarm signals delivered by the gates can control a suitable system for sorting or marking or alternatively for counting.

Exemplified embodiments of the invention will now be given in the following description, reference being made to the accompanying drawings, in which:

FIG. 3 is a vector analysis diagram providing an explanatory illustration of the invention;

It is known that, when making a nondestructive eddy-current test, it is possible to determine a scanning frequency which permits selection of the phase of the defect signal. Display of the phase analysis is based on the study of the phase displacement between the current which passes through a measuring detector and the variation in unbalance voltage of a bridge which results from the variation in impedance of one of the two coils of the detector which are mounted in two adjacent arms of the bridge.

Figure 1:
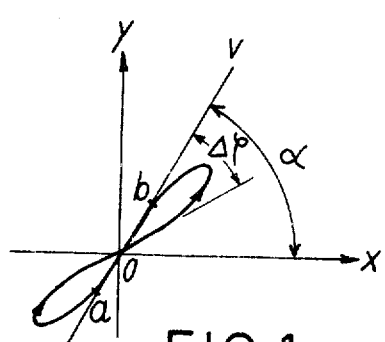
FIGS. 1 and 2 are known diagrams of phase analysis of a defect signal derived from a nondestructive eddy-current testing instrument.

FIG. 1 shows the oscillogram of a defect signal in accordance with the method of the complex impedance plane. In fact, the defect signal can be represented by a point corresponding to the end point of a vector which represents the unbalance voltage of the bridge and therefore the variations in impedance of the detector windings. If the resistive and reactive components are applied to the deflection plates of a cathode-ray tube, the progressive variation of this point when a defect appears on the part to be tested takes place in a more or less closed "eight". The defect modifies successively the impedance of the two detector windings and consequently causes two successive unbalances of the measuring bridge, which explains the shape of the figure eight. The phase of the figure eight varies within a sector $\Delta \phi$. When the sample is homogeneous and does not have any discontinuity, the point remains at the center of the screen.

Figure 2:
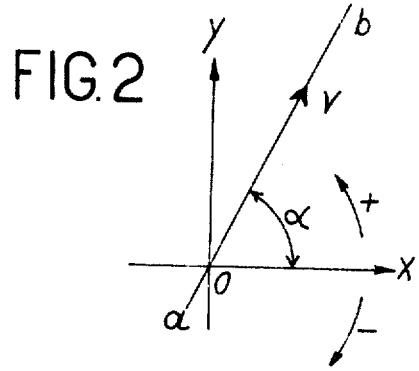

A defective condition can therefore be represented by a vector $v$ (as shown in FIG. 2) in which the origin is the center of the figure eight, the direction is that of the rectilineal portion $ab$, the sense of direction is that of the first unbalance (the direction of travel being always the same), the peak amplitude of the vector $v$, the peak-to-peak amplitude of the eight, the phase of a vector located above the axis OX is positive and negative if it is located beneath this latter.

Experience has shown on the one hand that the angle of inclination $\alpha$ of the eight determines the nature of the flaw and on the other hand that the peak-to-peak amplitude of the eight determines its extent. In order to reject a part, it is therefore possible to locate on the impedance plane the zones in which the different types of defect appear (as shown in FIG. 3). This diagram shows that it is possible to identify such defects as a function of their phase. For example, the sector $\phi_1$ will correspond to the localized defects of the local-formation type, $\phi_2$ will correspond to external defects, $\phi_3$ will correspond to internal defects whilst the extent of such defects is indicated for example by, the peak amplitude of vector $V_1$, for example, which passes beyond the threshold level indicated by $S_3$ or $S_3'$ as the case may be. The object of the invention is to deliver an alarm signal when the end point of the vector is found to be present within one of the shaded zones.

Figure 5:
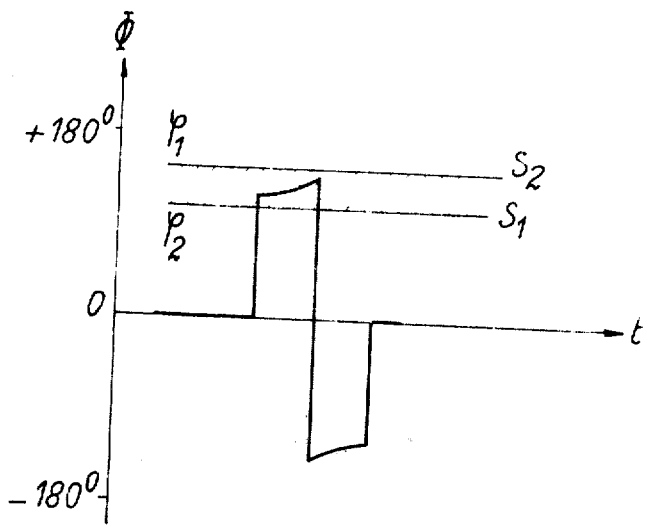
FIGS. 5 and 6 are diagrams of the characteristic signals of the phase and peak amplitude of the device.
Figure 6:
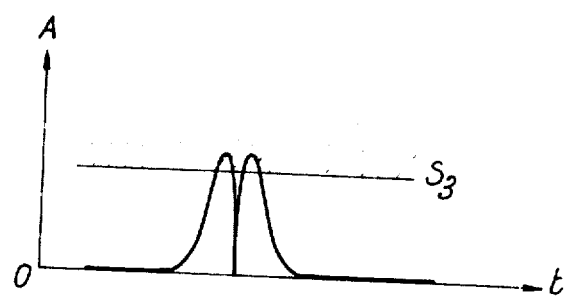

In accordance with the invention, the device makes it possible to select the parts to be tested as a function of the nature and extent of defects. The nature of the defect is determined as a function of the phase of the signal by selecting in the phase diagram a band or range comprised between two thresholds $S_1$ and $S_2$ (as shown in FIGS. 3 and 5). The extent of the defect is obtained by selecting from the defects of the selected nature those in which the amplitude exceeds a threshold $S_3$ corresponding to the peak amplitude A (FIG. 6).

The device can comprise one or a number of phase-analysis channels and in this case the amplitude threshold can be either identical or different for each peak amplitude in the phases selected. On the basis of this selection of defects, it is possible to control different alarm systems such as visual alarm devices (flash-lamps) or operations involving counting, marking, recording or sorting.

Figure 4:
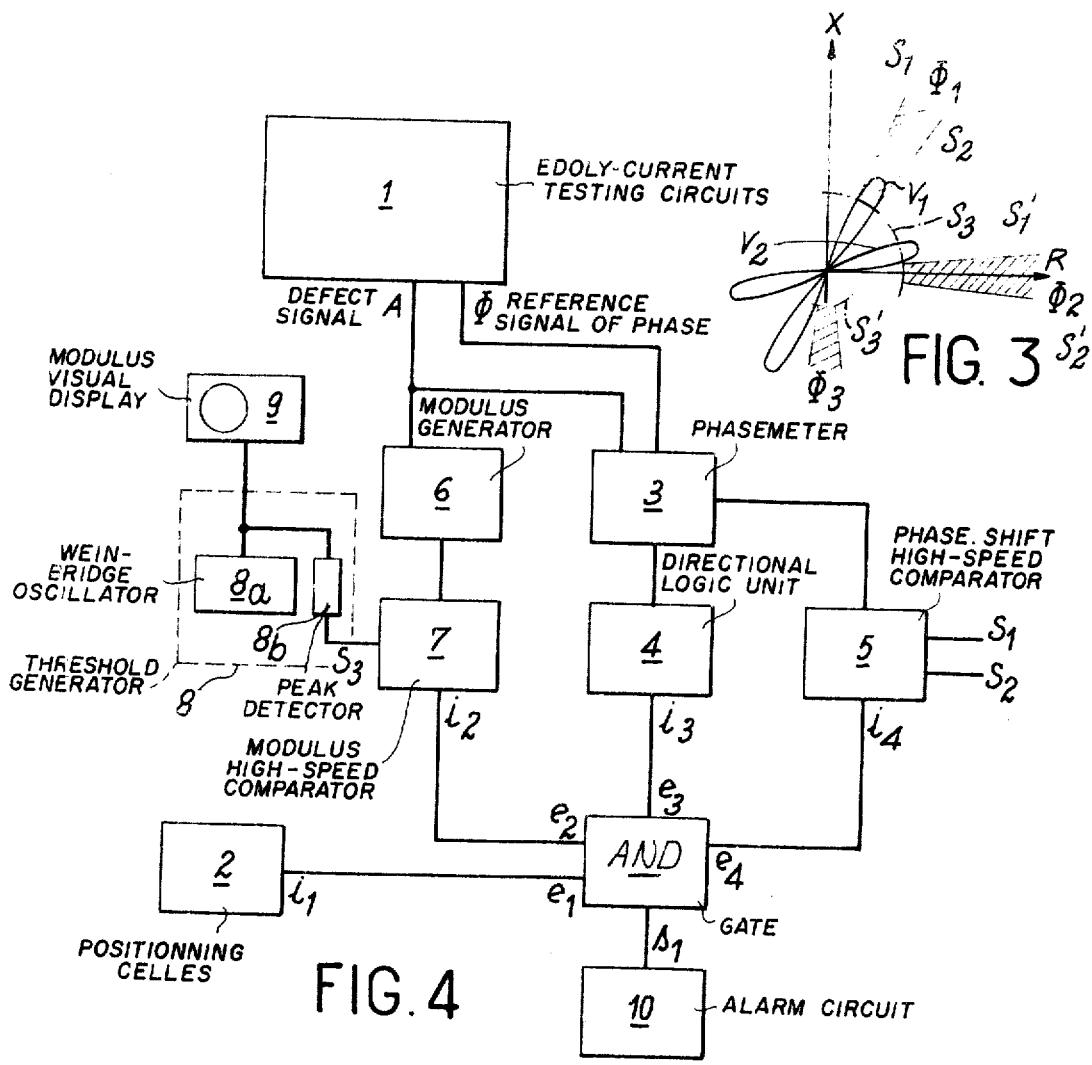
FIG. 4 is a block diagram showing the general arrangement of the device according to the invention.

In accordance with the invention, the device of FIG. 4 comprises a basic circuit 1 which is usually employed in nondestructive eddy-current testing instruments and in which the scanning means generate a defect signal A and a phase reference signal $\phi$ indicative of the phase of the current passing through the detector coils.

The defect signal A and the reference signal $\phi$ (FIGS. 2 and 3) are applied to a phase meter 3 and this latter delivers an analog signal which is proportional to the phase of the defect signal and therefore to the phase of the flaw condition within a range of + or − 180°.

The phase meter 3 is connected to a directional logic unit 4 and to a high-speed comparator 5. The directional logic unit 4 serves to detect the direction of the first unbalance of the phase; this latter is positive if the figure-eight loop (shown in FIG. 1) is located above the axis OX or negative if said loop is located beneath the axis OX. The directional logic unit delivers a signal $i_3$ when the first variation of the phase analog signal is in the direction of the band or range $S_1 S_2$. The high-speed comparator 5 determines whether the phase analog signal is between the two thresholds $S_1$ and $S_2$ and delivers a logical signal $i_4$ relative to the threshold of the phase.

The defect signal A is applied simultaneously to the phase meter 3 and to the input of a circuit 6 for peak detecting the defect signal A and for generating the peak amplitude signal whose amplitude is a function of the extent of said defect. The output of the generating circuit 6 is connected to a high-speed comparator 7 for the peak amplitude, which delivers a logical signal $i_2$ relative to the peak amplitude when the amplitude of the signal is higher than a threshold $S_3$.

A threshold generator 8 is connected on the one hand to a second input of the high-speed amplitude comparator 7 and on the other hand to a visual display device 9 comprising an oscilloscope, for example. Said generator 8 comprises a Wien-bridge oscillator 8a which generates a sine-wave signal at a frequency of the order of 1 kc/s and of stabilized amplitude. The sine-wave signal, which is applied to the device 9 for the visual display of the peak amplitude threshold, serves to generate a circle on the oscilloscope. Said sine-wave signal is employed after passing through a peak-detector $8b$ for the purpose of determining the threshold $S_3$ of the peak amplitude.

In order to eliminate false alarms, there are placed in proximity to a detector at least two assemblies consisting of lamps and photoresistive cells (block 2 of FIG. 4) referred-to as positioning cells which deliver a logical signal $i_1$ relative to the presence of a part within the detector in the case of testing of a tube, for example. This avoids the need to trigger an alarm signal when the ends of the part are inserted in or withdrawn from the coil.

The logical state 1 or 0 of the above-mentioned signals $i_1$ to $i_4$ depends on the following conditions:

when an inspection light beam is intercepted by a part which is engaged within a detector: $i_1$ is in state 1;

if the peak amplitude is higher than the threshold $S_3$ : $i_2$ is in state 1;

if the first phase signal output is of predetermined polarity, $i_3$ is in state 1;

if the phase is between the thresholds $S_1$ and $S_2$ : $i_4$ is in state 1.

The logical signals $i_1$ to $i_4$ in state 1 represent the four logical states which are characteristic of the defect. Said signals are applied respectively to the inputs $e_1$ to $e_4$ of an AND-gate (shown in FIG. 4), the output of which is connected to an alarm device 10 which carries out the order imposed by the test process as mentioned earlier. Thus, as shown in FIG. 4, the alarm device 10 will provide a suitable alarm when the inputs $E_1$ to $E_4$ are all 1 or true. The coincidence of the true states of the $E_1$ to $E_4$ signals is shown in FIG. 3, when the figure-8-shaped signal $V_1$ is present. In particular, the phase of the figure-8 signal $V_1$ falls in the range between the first and second threshold levels $S_1$ and $S_2$ and the amplitude of the signal $V_1$ exceeds the third threshold level $S_3$. On the other hand, vector signal $V_2$ meets the amplitude requirement, but does not fall within the range between the phase threshold levels $S_1$ and $S_2$; as a result, the alarm device 10 is not actuated.

Figure 7:
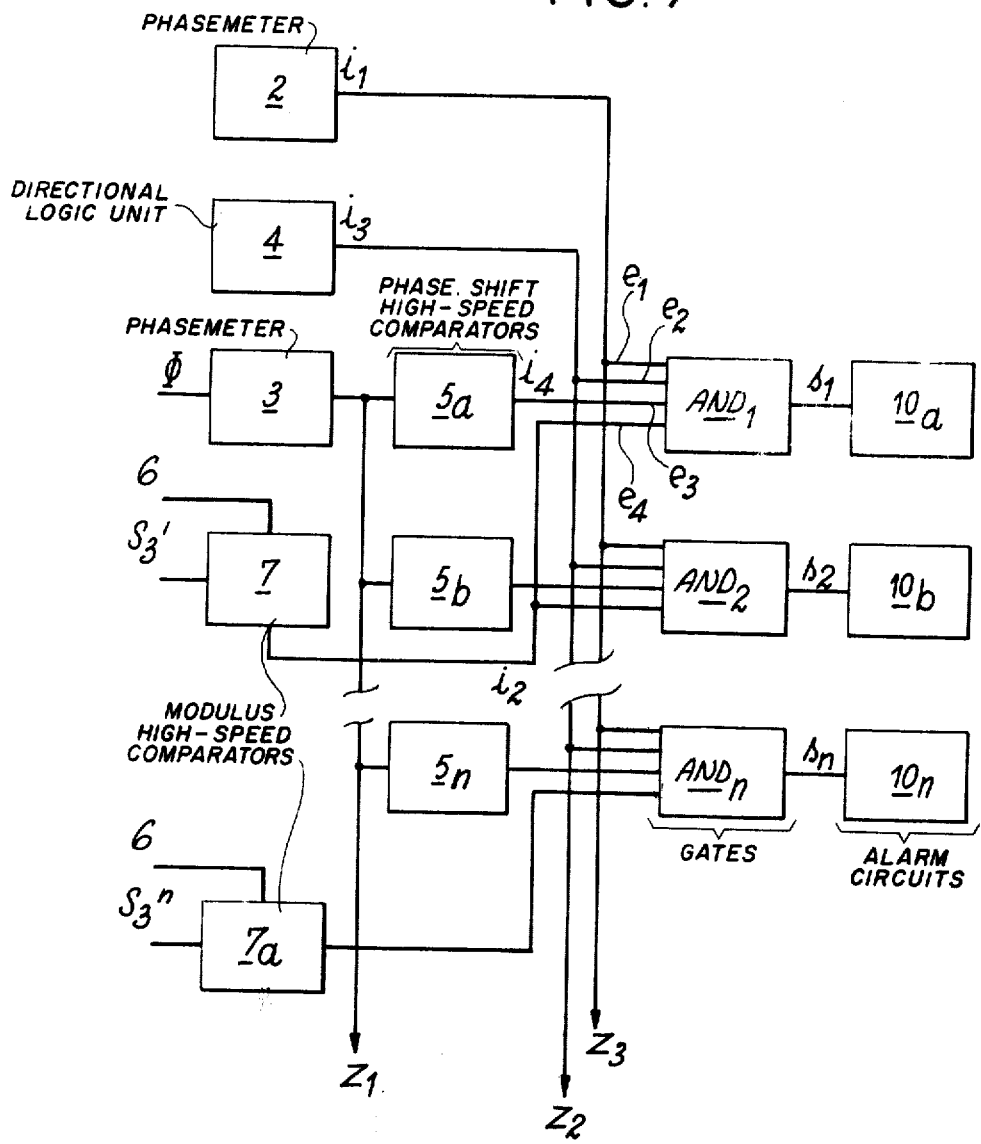
FIG. 7 is a diagram of an alternative embodiment of the device.

In accordance with the invention, the device of FIG. 7 comprises a number of scanning channels with means which are similar to those of the device of FIG. 4. The basic circuit 1 is not illustrated.

The positioning cells 2 are connected in parallel to a first input $e_1$ of the $AND_1$ to $AND_n$ gates. The directional logic unit 4 is connected in parallel to an input $e_2$ of said gates. The inputs of a number of high-speed phase comparators $5a$ to $5n$ are connected in parallel with the output of the phase meter 3 and the outputs thereof are connected individually to an input $e_3$ of said gates.

In the example chosen (FIG. 7) which permits detection of two different defects defined by their respective phase with the same peak amplitude threshold, the peak amplitude comparator 7 is connected to the inputs $e_4$ of two gates such as the $AND_1$ - $AND_2$ gates. In order to simplify the diagram, only the modulus comparator 7 is shown in FIG. 7. If the peak amplitudes have different thresholds ($\phi_3$ in FIG. 3), it is possible to have a comparator $7a$ connected to an input $e_4$ of an $AND_n$ gate. The inputs $e_1$ to $e_4$ of the $AND_1$ to $AND_n$ gates receive logical signals $i_1$ to $i_4$ which are representative of the defect and identical with those of the device shown in FIG. 4.

Alarm systems can be assigned to testing of the internal surface of a tube whilst other systems are assigned to its external surface. Further possibilities of connection of additional alarm channels are indicated diagrammatically by the arrows $Z_1$ to $Z_3$.

It is readily apparent that the invention is not limited to the particular embodiment which is illustrated and described by way of example and that the scope of the invention extends to any alternative form which remains within the definition of equivalent means.

What we claim is:

1. A system for the non-destructive testing of materials wherein an alarm is provided indicative of the type and extent of a defect in the materials, said system comprising:
   a. means for generating a defect signal indicative of the presence of a defect in the material under investigation and a phase reference signal;
   b. means responsive to the defect signal and the phase reference signal for measuring the relative phase difference between the defect signal and the reference phase signal and for providing a signal indicative of the phase difference;
   c. first comparison means responsive to the phase difference signal for providing a first logic signal indicative that the phase difference signal lies within a range between first and second threshold levels;
   d. means for detecting the peak amplitude of the defect signal for providing a signal indicative of the amplitude of the detected peak;
   e. second comparison means responsive to the peak amplitude signal for providing a second logic signal indicating that the detected peak amplitude signal exceeds a third threshold level;
   f. position indicating means responsive to the presence of a material to be tested by said system for providing a third logic signal indicative thereof;
   g. detecting means responsive to the phase difference signal for providing a fourth logic circuit indicative that the polarity thereof corresponds to that of the first and second threshold levels; and
   h. coincidence means responsive to the presence of all of the first, second, third and fourth logic signals to provide an alarm manifestation indicative of the extent and type of defect within the material under test.

2. The system as claimed in claim 1, wherein said phase difference measuring means generates the phase difference signal within a range of $\pm 180°$.

3. The system as claimed in claim 1, wherein there is included means for generating and applying a sine wave signal as the third threshold level, to said peak detecting means.

4. The system as claimed in claim 3, wherein there is included an oscilloscope coupled to said sine wave generator means for providing a display of the generated threshold level signal.

5. The system as claimed in claim 1, wherein there is included a plurality of said first comparison means each coupled to receive the phase difference signal; a plurality of said second comparison means each coupled to receive the peak amplitude signal; a corresponding plurality of said coincidence means each coupled to receive the logic output signals of a corresponding second comparison means, of a corresponding first comparison means, of said positioning means and of said phase direction means and responsive to the presence of all of the logic signals applied thereto for providing an actuating signal; and a plurality of corresponding alarm means each responsive to the actuating signal applied thereto for providing an alarm indicative of the extent and type of defect of the material under test.

* * * * *